United States Patent [19]
Schnyder

[11] Patent Number: 5,813,960
[45] Date of Patent: Sep. 29, 1998

[54] PRESS ROLL AND MACHINE WITH PRESS ROLL

[75] Inventor: Eugen Schnyder, Waltenschwil, Switzerland

[73] Assignee: De Pretto-Escher Wyss s.r.l., Schio, Italy

[21] Appl. No.: 636,372

[22] Filed: Apr. 23, 1996

[30] Foreign Application Priority Data

May 15, 1995 [CH] Switzerland .................. 01 300/95

[51] Int. Cl.⁶ .................................................. B23P 15/00
[52] U.S. Cl. ......................................................... 492/18
[58] Field of Search .................... 492/2, 6, 7, 16, 492/20; 100/162 B, 169

[56] References Cited

U.S. PATENT DOCUMENTS 5,290,223  3/1994  Lehmann ................................. 492/2
5,474,656  12/1995  Brown et al. ............................ 492/7

*Primary Examiner*—Irene Cuda
*Attorney, Agent, or Firm*—Townsend and Townsend and Crew LLP

[57] ABSTRACT

A press roll contains a stationary carrier, a jacket tube with a roll jacket and a plurality of pneumatically loadable rollers in order to support the roll jacket at the press position on the carrier. The press roll is especially suited for use as an F-roll or as a K-roll in machines for treating web-like or plate-like material, for example printing machines, textile machines or the like.

17 Claims, 5 Drawing Sheets

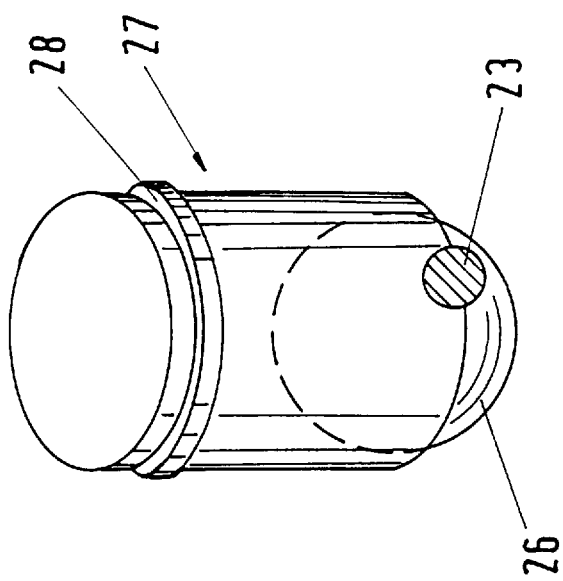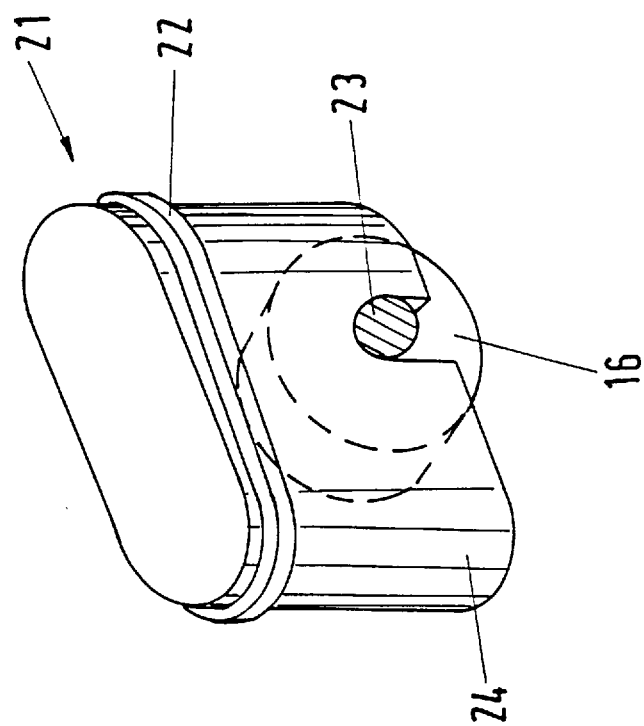

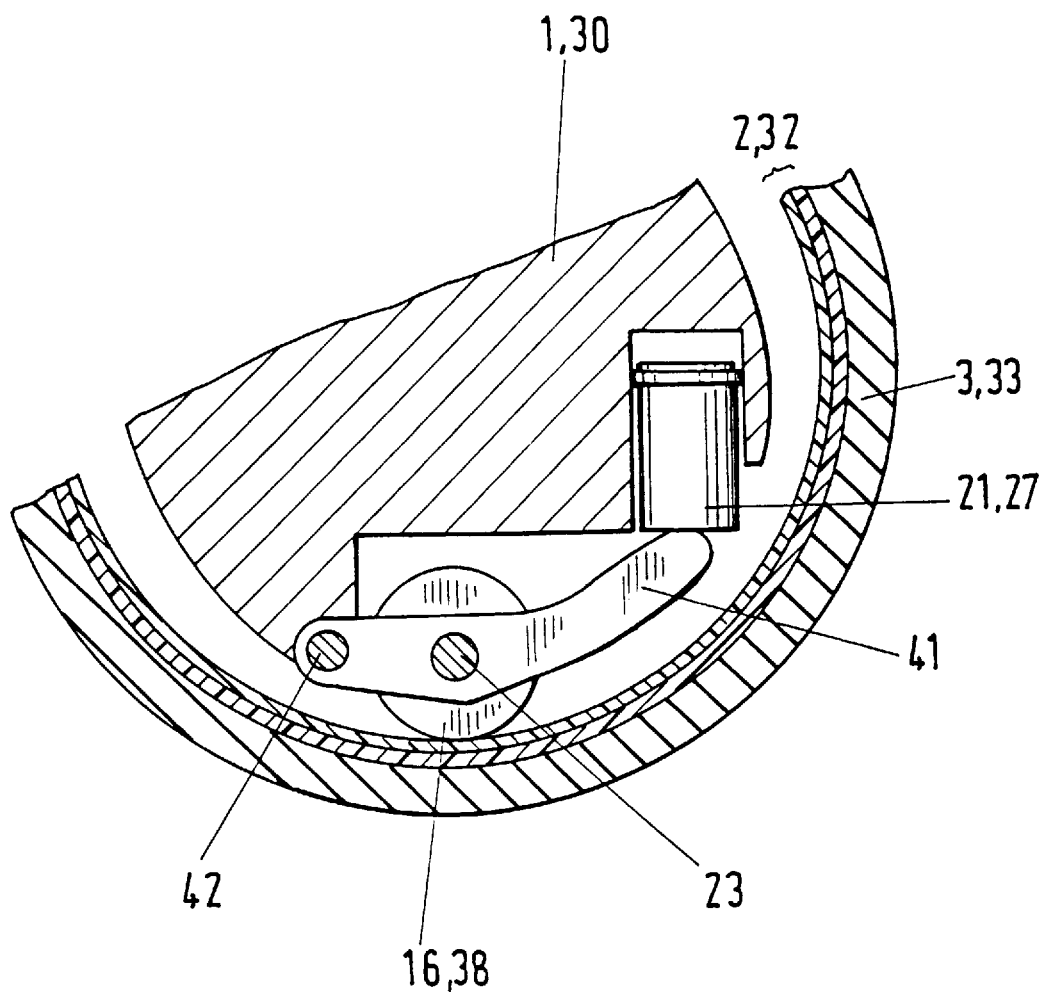

PRESS ROLL AND MACHINE WITH PRESS ROLL

BACKGROUND OF THE INVENTION

1. Field of the Invention

The invention relates to a press roll with a controllable bending line, and also to a machine for treating web-like or plate-like material with such a press-roll.

2. Description of the Prior Art

Such press-rolls, so-called NIPCO rolls, are known. These press-rolls contain a stationary carrier, a roll jacket rotating around the carrier, and a plurality of support sources in order to support the roll jacket at the carrier. The roll jacket is resiliently deformable and consists of a reinforced elastomer or polyurethane. The support sources are arranged lying in a row at equal intervals and can freely follow the bending deflection of a counter-roll. Each support source consists of a piston in cylinder arrangement which can be pressurized with a pressure liquid and a sliding shoe which is displaceable towards the roll jacket under the action of the arrangement.

These press rolls are used in the upper speed range, i.e. greater than 15 m/s, and in the upper linear force range, i.e. 300N/mm. This places high requirements on the constructional design and has the consequence of corresponding cost and complexity; an appropriate pressure source is in particular required.

SUMMARY OF THE INVENTION

The present invention provides a press roll with a controllable bending line, which can be used in the lower speed range, smaller than 15 m/s, and in the lower linear force range, 80N/mm, and which can be operated with a pressure medium having a maximum of 10 bars from a customary auxiliary energy network, with the press roll also being executed in a lightweight construction with its conformity being substantially improved.

The advantages which can be achieved by the invention are to be seen essentially in the fact that:

- the spaces between the positions at which force is introduced are lower with the pneumatically loaded rolling bodies;
- a uniform linear force can be generated with the use of a jacket tube and the drive torque of the roll can be kept small;
- when using a running jacket, which consists of ring sections and intermediate rings, or of helical windings which contact one another, the load distribution can be more uniformly distributed over the surface width of the roll and the axial flexibility can be improved;
- the manufacture can be made less expensive with the use of a piston-in-cylinder arrangement with an elongated cylinder block; and
- the field of use can be enlarged by using a force amplifier.

A machine for treating web-like material with the press roll is characterized in that the press roll is an F-roll or a K-roll.

From this the advantage results of a broad application for the press roll, for example in printing machines, in textile machines and the like.

BRIEF DESCRIPTION OF THE DRAWINGS

FIG. 3 is a perspective illustration of a preferred embodiment of a support element;

FIG. 4 is a perspective illustration of another embodiment of a support element;

FIG. 6 is a section along line VI—VI in FIG. 1, in which a support element is illustrated with an arrangement for force enhancement.

DETAILED DESCRIPTION OF THE PREFERRED EXEMPLARY EMBODIMENTS

Figure 1:
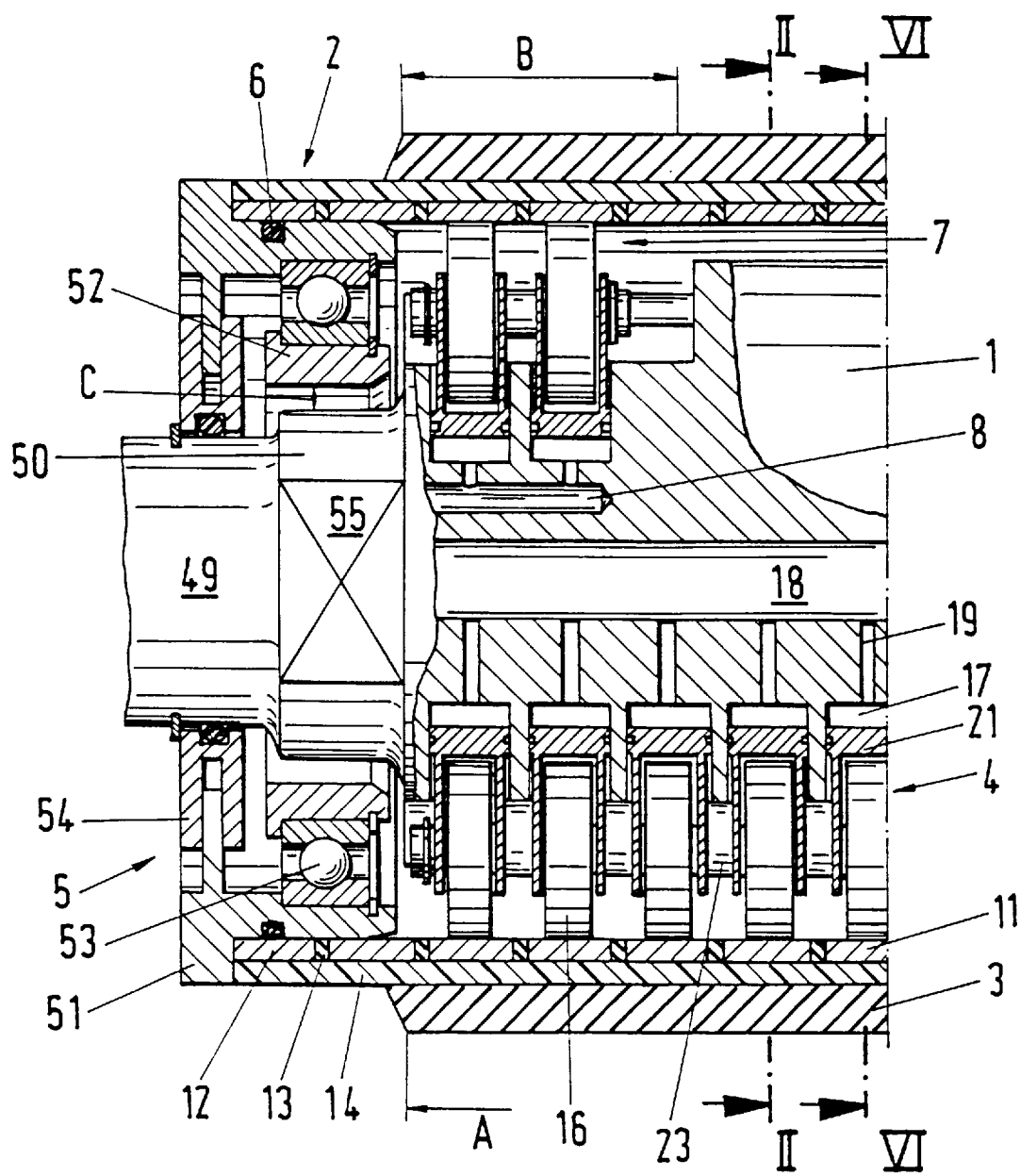
FIG. 1 is an end section of a preferred embodiment of a press roll in accordance with the invention in section.
Figure 2:
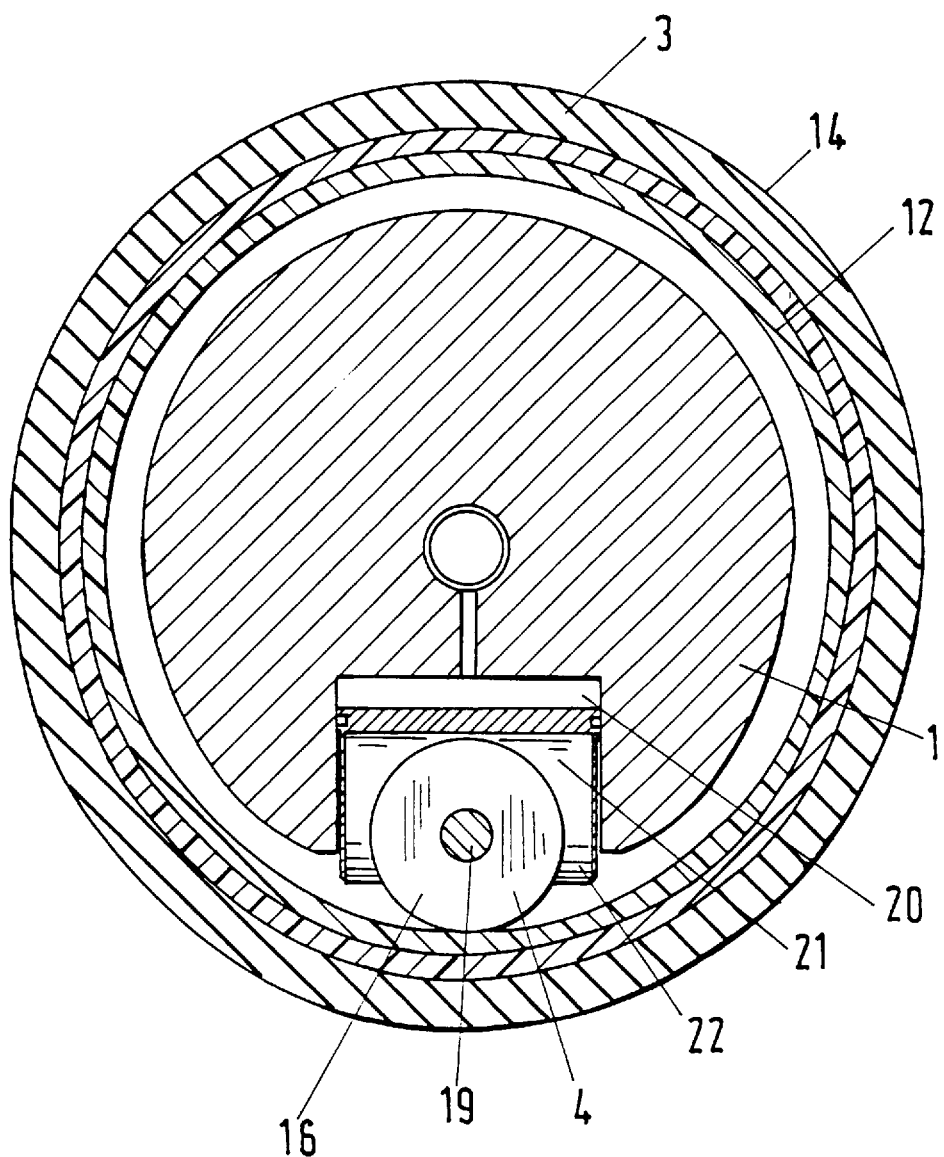
FIG. 2 is a section along the line II—II in FIG. 1.

Reference is made to FIGS. 1 to 3. A roll contains a carrier 1, which is rotationally fixedly arranged, a jacket tube 2 which includes a roll jacket 3 of an elastomer and which surrounds the carrier 1, and a plurality of support elements 4, which are arranged in a row distributed over the width area A of the roll. Furthermore, a guide bearing 5 is provided, on which the jacket tube 2 is arranged. A sealing ring 6 is arranged between the guide bearing 5 and the jacket tube 2. It is pointed out that the guide bearing at the other end section of the roll is designed in the same way. Furthermore, a retraction device 7 is provided.

The jacket tube 2 consists of a running tube 11, which is put together from a plurality of ring sections 12 of metal and intermediate rings 13 of a resiliently deformable material and a support jacket 14 of plastic. O-rings or a pre-vulcanized material can be used as the intermediate rings. The support jacket 14 consists with advantage of a glass-fiber reinforced plastic, which is applied to the running tube 11 through a winding process so that the jacket tube 2 is formed as one component. The roll jacket 2 of elastomer is subsequently applied to this component, for example vulcanized thereon.

The support elements 4 include a piston in cylinder arrangement and a rolling body 16 in the form of a rolling element bearing. The cylinder cut-outs 17 are formed in the carrier 1, which stands in connection with a line system. The line system includes a main string 18, which extends through the longitudinal extent of the carrier 1, and a number of branches 19 corresponding to the number of support elements 4, which open into the cylinder recess 17. The piston 21 has a piston ring 22 and is movably arranged in the cylinder cut-out 17 in order to support the ball bearing 16 relative to the roll jacket 2. The rolling bodies 16 are journalled on an axle 23. A basic orientation of the rolling body is achieved in advantageous manner through this axle. With this orientation it is ensured that the rolling bodies do not roll off on the edge when the running tube 12 is bent because the pistons 21 can be deflected transversely to the axis of the cylinder cut-out 17. The piston 21 has a section 24 which partly surrounds the rolling body and engages around the axle 23 so that the piston 21 stands in a direct operative connection with the axle 23.

In the embodiment shown in FIG. 4, the rolling body is a ball 26 which is journalled on the axle 23. In this case the piston 27 is of cylinder-like shape and is equipped with a piston ring 28. In this embodiment the piston-in-cylinder arrangement can be provided with a cylindrical bore.

Figure 5:
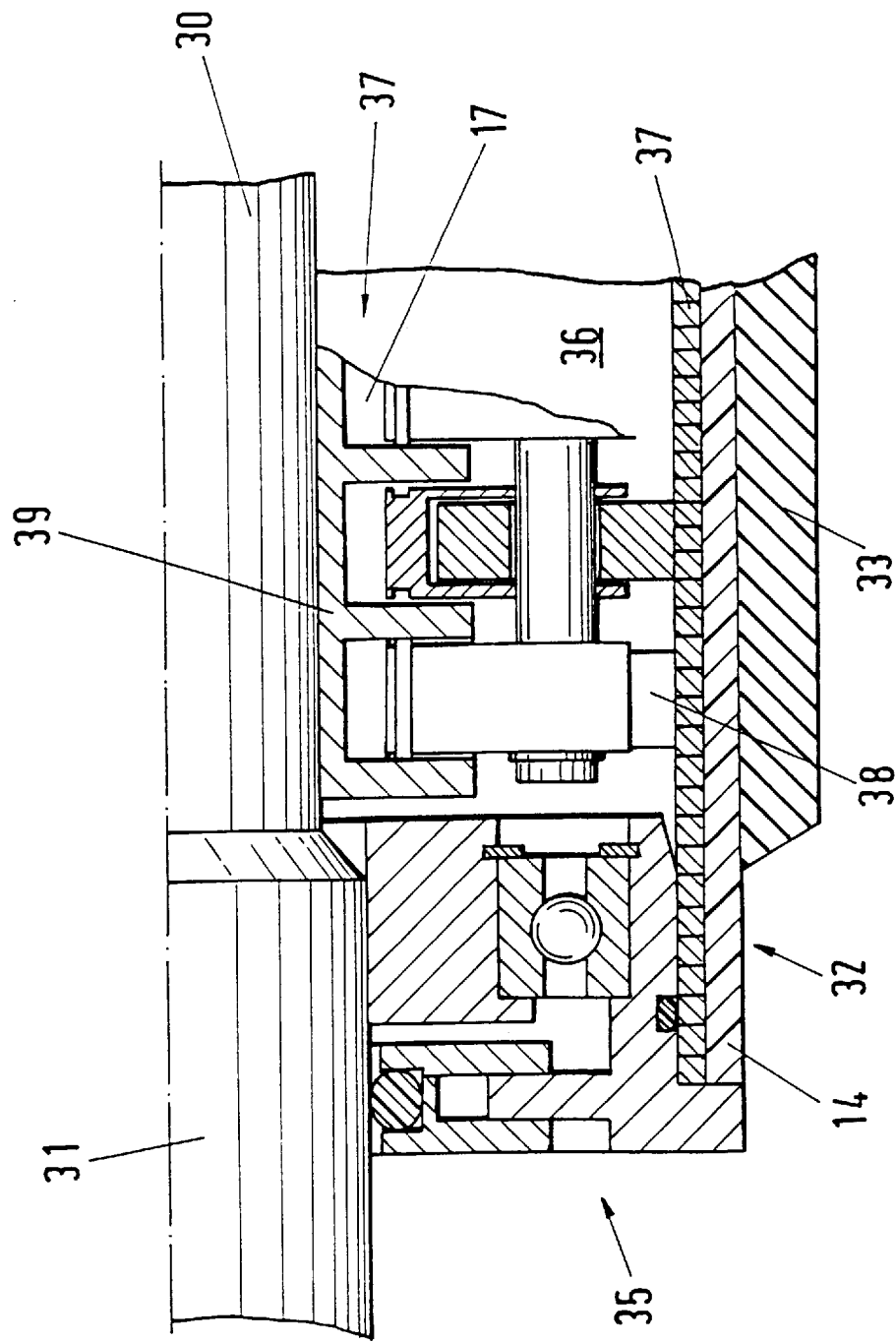
FIG. 5 is a part of an end-section of another embodiment of a press roll in accordance with the invention.

FIG. 5 shows a press roll which contains a fixed carrier 30, a jacket tube 32 with a roll jacket 33 of elastomer, and a plurality of support elements 4, the design and association of which relative to one another are the same as in the embodiment of FIGS. 1 to 3. Furthermore, a guide bearing 35 is provided on which the jacket tube 32 is arranged.

The jacket tube consists of a running tube 36, which is formed helically with windings 37 contacting one another, and of the support jacket 14 of glass-fiber reinforced plastic, which is applied as already mentioned by winding.

The support elements 4 include a piston-in-cylinder arrangement 37 and a rolling body 38. The cylinder cut-outs 17 are formed in a cylinder block 39, which is secured to the carrier 31. The cylinder cut-outs 17 are in connection with a line system (not shown). The piston 21 is movably arranged in the cylinder cut-out 17 in order to displace the rolling bodies 38 relative to the jacket tube 32. The rolling bodies 38 are journalled on the axle 23. The piston 21 has a section 24 which surrounds the rolling body and engages over the axle 23 (FIGS. 3 and 4).

With machines for treating or processing web- or plate-like material, press rolls are used which can be designed as freely movable self-adapting rolls, also termed F-rolls, or as concentrically guided rolls, also termed K-rolls. The distinction between the F-roll and the K-roll results from the design of the guide bearings at the end faces of the press roll and the use of the retraction device 7 in the F-roll.

The guide bearing 5 for an F-roll is shown in FIG. 1. The carrier has a bearing spigot 49 at both ends in order to arrange the press roll in a machine. A section 50 is formed adjoining the carrier 1 and cooperates with the guide bearing. The guide bearing has an outer ring 51, an inner ring 52, a ball bearing 53 and a sealing ring 54. The retraction device 7 has two support elements 4. These support elements 4 act on a section B in order to bend the jacket tube 2 contrary to the direction of action of the press roll. In this connection the support elements 4 are pressurized with compressed air via a separate line system 8. In order to permit the bending of the section B a spacing C is provided between the inner ring 52 and the carrier 1, and a guide surface 55 for the inner ring is formed at the carrier 1. The Racket surface region, which is not loaded during use, can be relieved or lifted off from a counter roll in an advantageous manner by the retraction device.

FIG. 5 shows the guide bearing 35 for the K-roll. The carrier 30 has a bearing spigot 31 in order to arrange the press roll in a machine. The guide bearing is designed in the same manner as the guide bearing 5 for the F-roll. In contrast to the F-roll, the inner ring 52 is supported on the bearing spigot of the carrier 31, whereby a guide surface on the carrier, such as is provided with the F-roll, can be dispensed with.

The press roll contains a stationary carrier 30, a jacket tube 32 with a roll jacket 33, and a plurality or pneumatically loadable roll bodies 38 in order to support the roll jacket 33 on the carrier 30 at the press position.

The press roll, which is executed in a light manner of construction, shows a good conformity and can be operated from a customary auxiliary energy network with a pressure of a maximum of 10 bar. The press roll can be used as an F-roll or as a K-roll in machines for the treatment of web-like or plate-like material, for example printing machines, textile machines or the like.

What is claimed is:

1. A press roll with a controllable bending line comprising a fixed carrier, a roll jacket rotating around the carrier and a plurality of support elements, with the support elements being distributed in a row over the roll width surface in order to support the jacket in the region of a press position at the carrier, wherein the support elements include pneumatically loadable rollers.

2. A press roll in accordance with claim 1, wherein a jacket tube is provided for the roll jacket, surrounds the carrier and the support elements, and is in operative connection with the support elements in order to introduce a rolling-off load into the roll jacket.

3. A press roll in accordance with claim 1, wherein the jacket tube consists of a running jacket and a support jacket.

4. A press roll in accordance with claim 1, wherein the running jacket comprises ring sections of metal and intermediate rings of elastically deformable material.

5. A press roll in accordance with claim 1, wherein the running jacket is formed from helical turns which contact one another.

6. A press roll in accordance with claim 1, wherein the roll jacket is secured onto the running jacket.

7. A press roll in accordance with claim 1, further comprising a plurality of piston-in-cylinder arrangements, with each arrangement being respectively associated with one roller.

8. A press roll in accordance with claim 1, further comprising an elongated cylinder block with a plurality of cylinder bores which are arranged in a row.

9. A press roll in accordance with claim 1, further comprising an axle on which the rollers are jointly journalled.

10. A press roll in accordance with claim 1, wherein the piston of the arrangement has a section which stands in connection with the axle.

11. A press roll in accordance with claim 1, further comprising an arrangement provided for force enhancement between each piston and each corresponding roller.

12. A press roll in accordance with claim 1, wherein each roller is cylindrical or ball-shaped.

13. A press roll in accordance with claim 1, wherein each roller consists of metal.

14. A press roll in accordance with claim 1, wherein each roller is a rolling element bearing.

15. A press roll in accordance with claim 1, wherein each roller has a shaped running surface.

16. A machine for treating web-like or plate-like material, the machine including a press roll having a controllable bending line and comprising a fixed carrier, a roll jacket rotating around the carrier and a plurality of support elements, with the support elements being distributed en a row over the roll width surface in order to support the jacket in the region of a press position at the carrier, wherein the support elements include pneumatically loadable rollers, and wherein the press roll is one of either an F-roll or a K-roll.

17. A press roll in accordance with claim 1, wherein each roller consists of non-metal.

* * * * *